May 31, 1949.                G. R. STEERE                2,471,792
                        APPARATUS FOR MAKING WATER GAS
Filed Sept. 28, 1945                                6 Sheets-Sheet 1

INVENTOR
*George R. Steere*
BY
*Benjamin Sweedler*
ATTORNEY

Patented May 31, 1949

2,471,792

UNITED STATES PATENT OFFICE 2,471,792

APPARATUS FOR MAKING WATER GAS

George R. Steere, Ipswich, Mass.

Application September 28, 1945, Serial No. 619,135

12 Claims. (Cl. 48—79)

This invention relates to the manufacture of water gas and more particularly to novel apparatus for making carbureted water gas. The application describes and claims apparatus for practicing the processes claimed in my copending application, Ser. No. 618,670, filed September 26, 1945.

Carbureted water gas processes are commonly carried out in a backrun water gas set consisting of a generator, carburetor and superheater located in separate and detached shells connected in series. The generator and carburetor are of substantially the same size and the top of the generator communicates with the top of the carburetor. The superheater is substantially higher than the carburetor and has its base communicating with the base of the carburetor. The top of the superheater is connected with a wash-box into which leads the backrun line from the generator. Oil is admitted to the carburetor at the top thereof in a direction cocurrent with the flow of water gas therethrough.

In such backrun equipment and in the conventional up and down run water gas sets which have been used for a great number of years prior to the development of the backrun, the air for blasting the fuel bed is introduced at the base of the generator and passed upwardly through the fuel bed, the resulting blast gases and the water gas during the make runs flowing downwardly through the carburetor and upwardly through the superheater.

In the recently developed "Reverse flow water gas set" a generator, carburetor and superheater, located in separate and detached shells are connected in series with the top of the generator communicating with the base of the carburetor, and the top of the carburetor communicating with the top of the superheater so that flow takes place up through the carburetor and down through the superheater, just the reverse of the direction of flow through these chambers in the conventional carbureted water gas equipment hereinabove described. In the operation of such "Reverse flow water gas sets" air for blasting is introduced at the base of the generator and flows upwardly through the fuel bed therein, the direction of flow of both the air and the steam through the fuel bed in the "Reverse flow water gas process" being the same as in the prior backrun water gas operations.

Since the air for blasting is introduced in the base portion of the fuel bed and flows upwardly therethrough the hottest portion of the fuel bed is at the base thereof, the temperature of the fuel bed decreasing in a direction towards the top of the bed. To protect the grates against these high temperatures it is the practice to operate with a bed of ash on the grates. This mode of operation involving the maintenance of a bed of ash at the bottom of the fuel bed for protecting the grates and a temperature gradient through the fuel bed such that the temperature increases towards the base portion of the fuel bed which base portion is at the highest temperature, has been found to result in the formation of large clinker masses particularly in the lower part of the fuel bed. Frequent clinkering operations are therefor necessary to effect the removal of such masses to maintain the fuel bed in a reasonably efficient condition for carrying out the water gas reaction. Such clinkering not only involves arduous labor but reduces the capacity of the set and the efficiency of the process.

It is an object of this invention to provide a water gas making apparatus particularly a carbureted water gas making apparatus in the operation of which the formation of large clinker masses in the fuel bed is avoided, and the fuel after substantially complete gasification thereof is converted to ash or small clinker particles which are substantially continuously removed from the fuel bed.

Another object of the invention is to provide a carbureted water gas making apparatus in which during the blasting step the blast gases flow downwardly through the superheater resulting in uniform heating of the checkerbrick therein, which uniformly heated checkerbrick are utilized in fixing the carbureted water gas made during a subsequent make step and are also utilized to superheat steam during another make step, such superheater and carburetor units being associated with a generator so that flow of backrun steam takes place up through the fuel bed in the generator and in the other make step of the cycle of steps steam is passed downwardly through the fuel bed in the generator. In other words it is an object of this invention to provide a carbureted water gas apparatus which is an improvement on the "Reverse flow water gas set" in that a complete reversal of flow is accomplished throughout the entire set, i. e., not only is the direction of flow through the carburetor and superheater units reversed but also through the generator unit of the set.

Another object of the invention is to provide an improved apparatus for making gas in which the backrun steam after passage through the active fire zone of the fuel bed flows through the portion of the fuel bed containing relatively fresh fuel in an uncarbonized condition the water gas removing volatiles from the fresh fuel and the thus enriched water gas is withdrawn from the set without being subjected to high temperatures which would cause over-cracking of the volatiles.

Still another object of the invention is to provied an apparatus for making carbureted water gas which in operation more efficiently utilizes the heat generated to produce gas as compared with known water gas making equipment.

Other objects and advantages of this invention will be apparent from the following detailed description thereof.

The carbureted water gas set, embodying this invention, involves a generator containing a bed of fuel preferably bituminous coal or coke communicably connected at its base with a heat regenerator chamber which may function as a carburetor. In the preferred embodiment the heat regenerator chamber communicates with the top of a second heat regenerator chamber which may function as a superheater. Preferably each unit is contained in a separate and detached shell although the two heat regenerator chambers, if desired, may be combined in one and the same shell. An offtake leads from the heat regenerator, e. g., the superheater to a wash-box or seal and an offtake, separate from and independent of the connection between the generator and heat regenerator leads from the top of the generator to a wash-box or seal which may be the same wash-box into which the offtake from the superheater leads. The interior of the heat regenerators may be built up with checkerbrick defining tortuous flues for the passage of gas as is well known in this art, or the heat regenerator functioning as the carburetor may be devoid of checkers or other heat absorbing material.

In a preferred embodiment of the invention the generator and superheater may be of substantially the same height, say approximately 28 feet from the ground level, and the carburetor approximately one-half the height of these units. The generator is provided with a bustle pipe having a series of ports extending through the generator walls at a point approximately midway between the top and the bottom of the generator for the admission to the fuel bed of air during the blasting step and steam during the make run. The fuel bed may extend well above these ports, the portion of the fuel bed between the ports and the bottom of the generator constituting the hot and active portion of the fuel bed for the production of water gas. A second bustle pipe is preferably provided for introducing tar or other hydrocarbon material into the side walls of the top of the active portions of the fuel bed. At the base of the generator a thin layer of ash from the consumed fuel occurs. The fuel bed rests on revolving crusher rolls or bars which function to effect continuous removal of ash from the fuel bed.

In operation air or other oxygen containing gas is introduced into the bed of fuel which may be bituminous coal or coke and passed always downwardly through the fuel bed the resultant blast gases being burned in the heat regenerator chamber communicating with the generator to heat this chamber, steam is then passed through this heat regenerator chamber and thence up through the fuel bed the resultant water gas being withdrawn directly from the generator and steam also passed during another step of the cycle of steps down through the fuel bed. When making carbureted water gas the water gas produced in the last mentioned step is introduced into the heat regenerator chamber which functions as a carburetor and the water gas carbureted by the addition of oil thereto.

Operating in this manner the air or other oxygen containing gas used in blasting the fuel bed first comes in contact with the portion of the fuel bed where the percentage of ash is lowest and the air or other oxygen containing gas is dispersed throughout the carbon content of the fuel bed. The oxygen containing gas reacts with the carbon to form carbon dioxide. This reaction being an exthermic one causes the portion of the fuel bed contiguous to the point where the oxygen containing gas is introduced thereinto to become highly heated; this portion of the fuel bed is the portion at the highest temperature. As the blast gases formed, pass down through the fuel bed, the fuel bed is heated, reaction takes place between the blast gases and the carbon of the fuel bed to form carbon monoxide, which reaction is endothermic preventing excessively high temperatures in the lower portion of the fuel bed. Thus the temperature of the fuel bed gradually decreases from the point where the oxygen containing gas is introduced in a direction towards the base of the fuel bed, the temperature at the base of the fuel bed being below the point at which substantial fusion of the ash constituents of the fuel bed takes place to form large clinker masses. The only portion of the fuel bed containing an amount of ash sufficient to cause formation of large clinker masses is the base portion of the fuel bed at which portion the temperature is below the fusing point of the ash so that large clinker masses cannot form.

In operation the ash is removed substantially as rapidly as it is produced resulting in a fuel bed which contains a gradually decreasing amount of ash in a direction towards the top of the fuel bed, there being little ash in the top portion of the fuel bed where the temperature may be above the fusing point of the ash.

In the operation of the preferred embodiment of the invention involving the use of a set comprising a generator, carburetor and superheater connected in series, blast gases are always passed downwardly through the fuel bed, flow up through the carburetor and down through the superheater efficiently heating the checkerbrick in the superheater chamber. Thereafter steam is passed in a reverse direction up through the superheater where it is efficiently superheated, down through the carburetor into the bottom of the generator and passes up through the fuel bed therein. The resultant water gas flows through the portion of the fuel bed which has been blasted during the preceding step and preferably also through a superimposed portion of the fuel bed containing fresh or green coal, when coal is used as the generator fuel, removing volatiles from the coal. The resultant mixture of water gas containing volatiles is withdrawn from the generator and passed directly to the wash-box. It will be noted that this mixture does not pass through the hot fuel bed thereby avoiding over-cracking of the volatiles resulting in an enrichment of the water gas with consequent saving in the amount of oil which need be added for this purpose.

Preferably in the reverse run from 60% to 95% of the total steam introduced in each cycle of steps, i. e., blast, reverse or backrun and a run in which steam passes down through the fuel bed, is passed through the fuel bed during the backrun, and this backrun is the first make run which follows the blast. The remainder of the total steam introduced in each cycle of steps to make gas is passed down through the fuel bed following the completion of the backrun. The water gas thus produced is passed up through the carburetor where it is enriched by oil introduced into the top portion of the carburetor in a direction countercurrent to the flow of water gas therethrough and the resultant carbureted water gas is fixed by flow downwardly through the superheater. The carbureted water gas thus produced and the water gas formed during the backrun with or without enrichment by the volatiles removed from the coal are mixed in a suitable holder.

It will be noted in the apparatus hereinabove described complete reversal of flow throughout the entire set is accomplished, i. e., not only is the direction of flow through the carburetor and superheater units reversed during the backrun as compared with the direction of flow during the blast, but also the flow through the generator is reversed. Moreover as compared with known water gas making techniques my invention more efficiently utilizes the heat generated to produce gas. This may be chiefly attributed to the reverse run in which as much as from 60% to 95% of the total steam is employed, which steam removes heat from the superheater and carburetor units and restores this heat to the fuel bed in the generator permitting its effective use in the water gas making reaction. Furthermore since in the preferred embodiment of this invention the carbureted water gas making step involving the flow of steam through the fuel bed does not immediately follow the blasting step, uniform production of gas throughout the make steps results. In prior operations in which the carbureting water gas step followed the blasting step, since the steam employed in this step was introduced in the fuel bed when it was at its maximum temperature a maximum amount of water gas was generated which amount of gas was augmented by the oil gas produced in the carburetor, resulting in peak production of gas during the initial portion of the uprun step. In the preferred embodiment of my invention a reverse or backrun follows the blasting step and when the temperature of the fuel bed has been reduced from its maximum point as a result of the backrun, a run is employed involving the flow of steam through the fuel bed and the carburetion of the water gas thus produced resulting in more uniform generation of gas throughout the make steps.

In the operation of a set in which the generator is of standard height, i. e., substantially the same as the carburetor, the air for the blasting step and the steam during the make run in which the steam is passed down through the fuel bed is introduced into the generator above the top of the fuel bed and passed downwardly therethrough. Tar or other hydrocarbon material may be introduced into the top of the active portion of the fuel bed, in some or all of the modifications hereindisclosed, to form masses of carbon contiguous to the side walls of the generator and thereby prevent, as more fully described hereinafter, channelling of the gas along the sides of the fuel bed and adhesion of ash to the brick lining of the generator and the fusion thereof to form clinker masses.

In the accompanying drawings forming a part of this specification there is shown for purpose of exemplification preferred embodiments of carbureted water gas sets for practicing this invention. It will be understood, however, that the invention is not limited to the sets illustrated.

Figure 1:
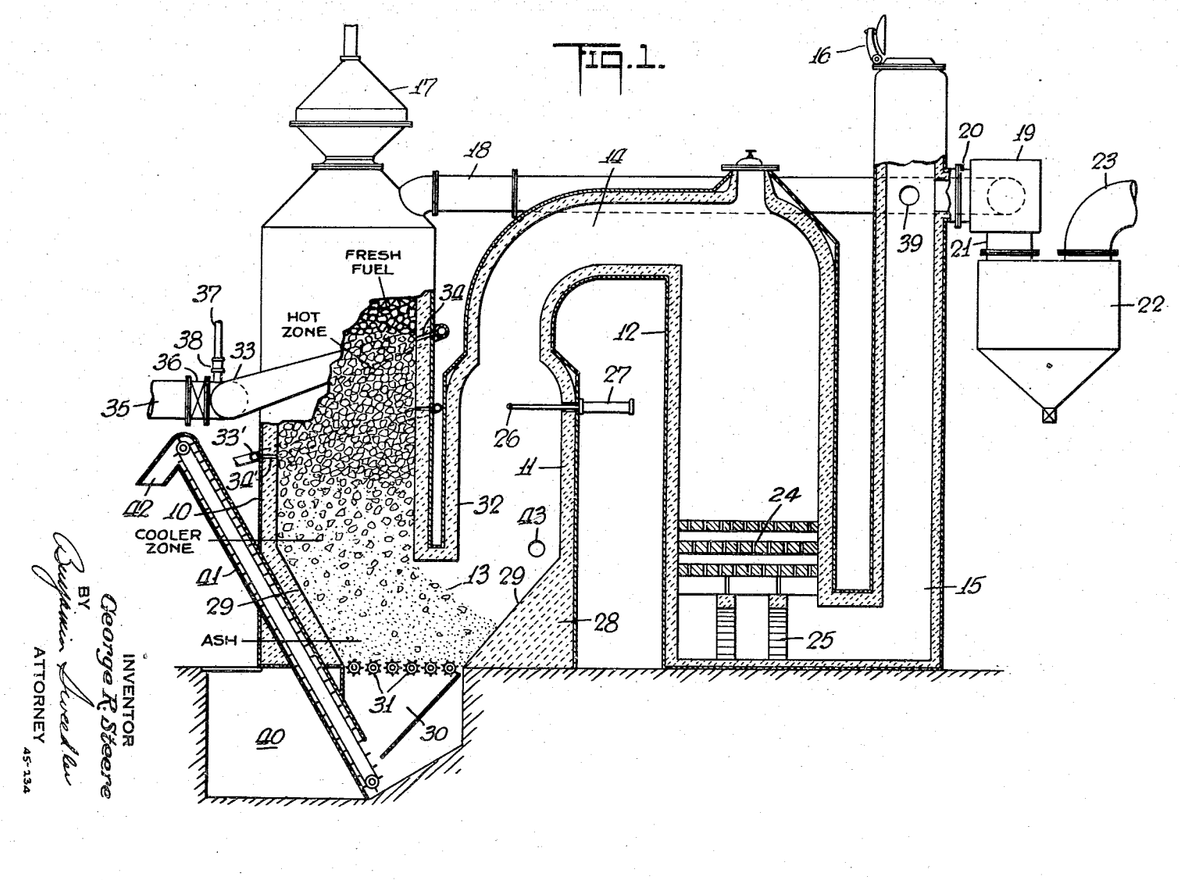
Figure 1 is a vertical section partly in elevation of a carbureted water gas set embodying this invention.

Referring to Figure 1 of the drawings reference characters 10, 11 and 12 indicate the generator, carburetor and superheater, respectively, located in separate and detached shells and connected in series with the bottom of the generator communicating with the bottom of the carburetor through passageway 13 and the top of the carburetor 11 communicating with the top of the superheater through the refractory lined passageway 14. A stack 15 leads from the base of the superheater and is provided at its top with a stack valve 16. The generator is provided with a charging device which may be of any well known type and is indicated by the reference character 17. A backrun pipe 18 leads from the top of the generator 10 to a three way valve housing 19, which three way valve may be of the standard type now commonly used to control flow through backrun water gas sets. This housing 19 is connected by a pipe 20 with the stack 15 and by pipe 21 with a wash-box 22 of any well known type. Gas offtake 23 leads from the wash-box to the usual by-product recovery equipment.

As customary the superheater is provided with checkerbrick 24 supported on piers 25 and is thus a heat regenerator chamber as will appear from the description hereinafter. The carburetor 11 is preferably devoid of checkers although if desired two or more layers of checkerbrick may be disposed near the base portion thereof. This carburetor is provided with a retractible oil spray 26 near the top thereof for introducing oil which may be heavy oil such as Bunker C oil into the upwardly flowing stream of water gas. The oil spray 26 may be retracted from the carburetor by means of a hydraulic cylinder 27 during the blasting step and also during the reverse steam run, if desired; when it is desired to add oil to the reverse steam and to the make water gas the oil spray is moved into the carburetor in the position indicated in Figure 1 of the drawings by the hydraulic cylinder 27 as will be understood by those skilled in the art.

The generator 10 in the embodiment of the invention shown in Figure 1 is of the same height as the superheater 12, whereas the carburetor is of a height approximately one-half that of the generator and superheater. Both the generator and carburetor rest on a supporting foundation 28, the interior walls 29 thereof sloping towards each other to form a rectangular ash pit 30. An ash removing device 31 which may be in the form of crusher bars or rollers adapted to be rotated by any suitable driving mechanism (not shown) is disposed in the ash pit 30 at the base of the inclined walls 29. This ash removing device supports a bed of fuel in the generator, as shown in Figure 1 of the drawings, a portion of this fuel bed extending into the base portion of the carburetor. The ash removing device it will be noted is disposed well below the bottom of wall 32 defining the upper portion of the connection 13 between the generator and carburetor so that the ash removing device is disposed out of the path of movement of the hot gas flowing from the generator to the carburetor.

A bustle pipe 33 encircles the generator and is provided with a series of ports 34 extending through the walls of the generator. This bustle pipe it will be noted lies in a plane at an acute angle to the longitudinal axis of the generator so that the ports 34 lie in a like plane. Hence the distance from each of the ports to the passageway 13 communicably connecting the generator with the carburetor is substantially the same as will be evident from an inspection of Figure 1. Thus air during the blasting cycle and steam during the make cycle introduced through these ports flows through substantially the same extent of fuel bed. The bustle pipe 33 communicates with a main 35 for supplying air under pressure thereto. A valve 36 controls the flow of air to the bustle pipe. A second bustle pipe 33' provided with a series of ports 34' extending through the walls of the generator, may be provided to supply tar such as water gas tar, or coal tar, or other hydrocarbon material to the sides of the fuel bed. This bustle pipe is disposed just below the bustle pipe 33 and is thus positioned at the top of the active portion of the fuel bed. The ports 34' are positioned at spaced intervals completely around the circumferential surface of the fuel bed and preferably, as in the case of the ports 34, lie in a plane at an acute angle to the longitudinal axis of the generator so that the distance from each of the ports to the passageway 13 is substantially the same.

A steam line 37 provided with a valve 38 supplies steam to the bustle pipe 33 during the make run. A steam line 39 leads into the top portion of the stack for supplying steam to the set for the reverse run.

The ash pit 30 is disposed in a sump 40 in a concrete foundation for the set. Liquid such as water is maintained in the sump to provide a liquid seal for the bottom of the generator and the communicating carburetor, preventing escape of gases from these units. An endless conveyor 41 receives ash from the pit 30 substantially continuously discharged by the ash removing device 31 and moves this ash through the liquid seal to a discharge chute 42 from which the ash may be discharged into a dump truck or other device for effecting disposal thereof. Instead of the endless conveyor a worm, or other ash removing device may be used. Thus the ash may be discharged continuously without interfering with the gas making operation.

Figure 3:
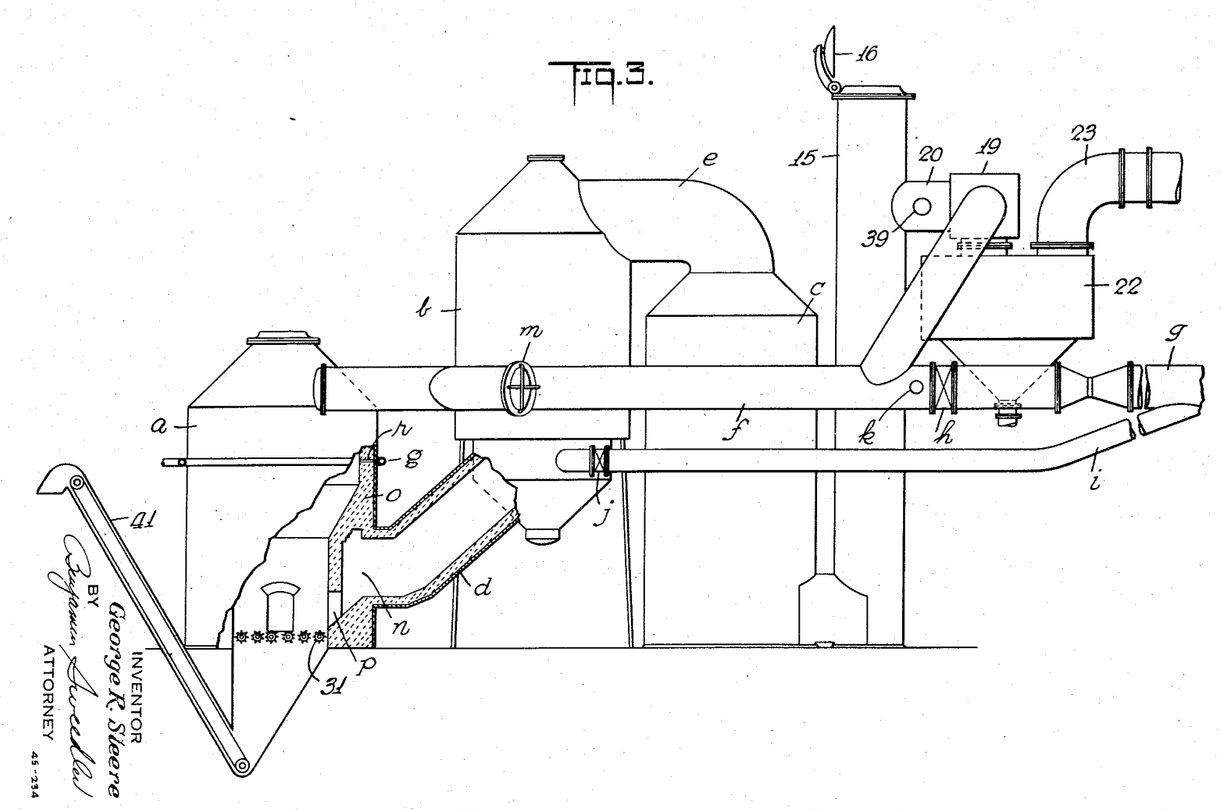
Figure 3 is a vertical section partly in elevation of still another modified form of a carbureted water gas set embodying this invention.
Figure 5:
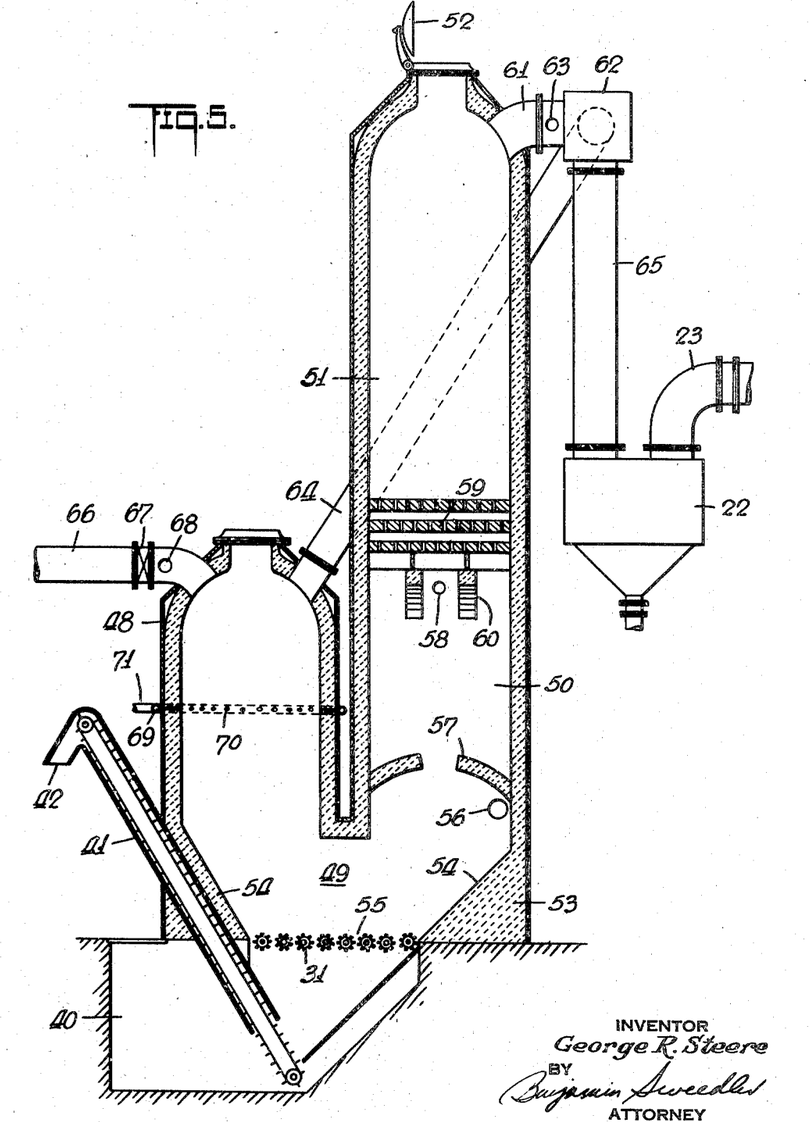
Figure 5 is a vertical section partly in elevation of a two shell carbureted water gas set embodying this invention.

Instead of the type of generator shown in Figure 1, of a height approximately equal to that of the superheater, a generator such as shown in Figures 3 or 5 of a height equal to that of the carburetor may be employed in conjunction with the carburetor and superheater of Figure 1; the generator and carburetor having a base connection such as shown in Figure 1.

In operation the generator 10 is charged with fuel which may be coal or coke, preferably bituminous coal until it is substantially completely filled, i. e., to a height below the gas offtake 18. This charging may be accomplished by the automatic charging machine 17. Preferably, but not necessarily, the dimensions of the generator are such that the space above the ports 34 and below the offtake 18 in which the fresh fuel accumulates in the generator is adequate to contain enough fuel to operate the machine for about 5 hours the fuel in this space being replenished from time to time as needed by the automatic charging machine to maintain the level of fuel within the generator substantially constant.

The fuel bed is first blasted by passing air or other oxygen containing gas through bustle pipe 33 and ports 34 into the generator downwardly through the fuel bed therein, the air or other oxygen containing gas reacting with the carbon of the fuel fed to form carbon dioxide, and as the blast gases pass down through the fuel bed heating thereof takes place by the sensible heat of the blast gases. Also the blast gases react with the carbon of the fuel bed to form carbon monoxide which reaction is endothermic preventing rise of temperature in the lower portion of the fuel bed. The temperature of the fuel bed thus varies from the highest temperature at the point of introduction of the air into the fuel bed to a lower temperature at the base portion of the fuel bed, the blasting operation being carried out so as to avoid creation of a temperature in the portion of the fuel bed indicated by the legend "Cooler zone" which is above the fusing point of the ash in this zone. Thus, as shown in Figure 1, at the end of the blasting cycle the fuel bed consists of a zone constituted of green coal which zone is disposed above the ports 34, a lower zone constituting the hottest zone in the fuel bed, a still lower zone designated as the "cooler zone" and a zone indicated by the legend "ash" contiguous to the ash removing device 31. It will be noted the direction of the blast is always downwardly through the fuel bed.

To support combustion of the blast gases thus produced, secondary air is admitted to the base of the carburetor through an inlet 43. The resultant blast gases burn as they flow up through the carburetor and down through the superheater and leave the set through the stack 15, stack valve 16 being open and three way valve 19 positioned so that flow through the backrun line 18 is prevented.

Upon termination of the blasting cycle which may be of from 50 to 100 seconds duration, a reverse run follows. Before the steam is introduced through inlet 39, stack valve 16 is closed, the three way valve 19 being moved to close connection 20 and place the backrun line 18 in communication with the wash-box. Steam is introduced through inlet 39 flows down through the stack 15 up through the superheater and down through the carburetor, the steam thus removing heat from the stack, superheater and carburetor and restoring this heat to the fuel bed. The resultant superheated steam flows through passage 13 up through the fuel bed, the water gas thus produced flowing through the green coal zone where it removes volatiles. The resultant mixture of gases passes through pipe 18 into the wash-box 22. It will be noted the mixture of water gas and coal volatiles does not pass through the hot portion of the fuel bed, nor is it otherwise subjected to high temperatures which would cause over-cracking of the volatiles with consequent carbon formation and reduction in the quality of gas produced. This reverse run may be of from 100 to 180 seconds duration, and in this reverse run from 60% to 95% of the total make steam employed in each cycle of steps is passed through the stack, superheater and carburetor and into and through the fuel bed.

A make run follows this reverse run and for this purpose the three way valve 19 is operated to open the port connecting the stack 15 with the wash-box and to close the backrun pipe 18. Steam is introduced by pipe 37 through ports 34 into the top of the hottest zone of the fuel bed flows down through the fuel bed the resultant water gas passing up through the carburetor countercurrent to the oil introduced by spray 26. This oil may be heavy oil. The carbonaceous deposits formed upon the decomposition of the oil, it will be noted, settle onto the portion of the fuel bed in the base of the carburetor and is consumed in the subsequent blast and make runs. The carbureted water gas thus produced flows down through the superheater where it is fixed and then passes through the stack into the wash-box. This run may be of 60 to 120 seconds duration. From 5% to 40% of the total make steam employed in each cycle of steps is passed through the fuel bed during this make step.

The above three steps represent the main steps of the cycle of steps, which cycle of steps is repeated, preferably in the order mentioned, throughout the operation of the set. As the set is operated, ash is continuously withdrawn by conveyor 31, coal added to the green coal zone is continuously gasified, i. e., volatiles are removed by the backrun water gas which volatiles enrich the make gas resulting in a reduction of the oil requirements, and in the further progress of the coal through the fuel bed complete gasification thereof is effected without the formation of large clinker masses, any small clinker particles being crushed by the ash removing device 31 and removed with the ash from the fuel bed. Thus my invention provides a continuous gasification process in which coal is completely gasified and the heat generated is efficiently utilized to make combustible gas. By having the reverse steam step immediately follow the blast the heat generated is most efficiently used and excessive peak formation of gases avoided as hereinabove pointed out.

Figure 2:
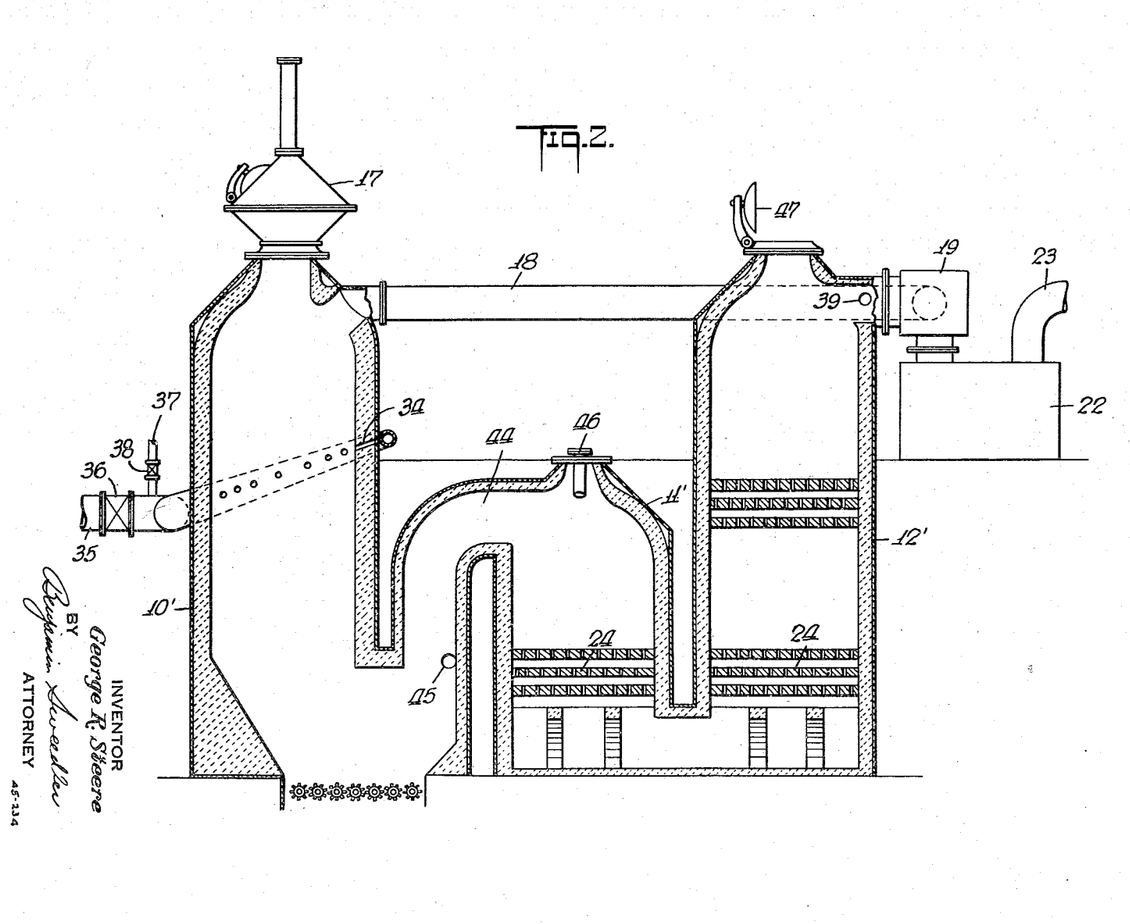
Figure 2 is a vertical section partly in elevation of a modified form of a carbureted water gas set embodying this invention.

In the modification of Figure 2 like reference numerals have been used to indicate like parts. This modification differs from that of Figure 1 chiefly in that it involves the use of a reverse flow generator embodying my invention with a carburetor and superheater in which the flow of water gas takes place down through the carburetor and up through the superheater and flow of reverse steam takes place down through the superheater and up through the carburetor. In the set of Figure 2 generator 10' is connected to carburetor 11' by a refractory lined passageway 44 which leads from the base of the generator into the top of the carburetor. Secondary air inlet 45 is provided in the base of this connection to supply secondary air to support combustion of the blast gases. An oil inlet 46 is disposed at the top of the carburetor to supply oil which may be heavy oil to the carburetor during flow of water gas therethrough, the oil and gas flowing cocurrently down through the carburetor and the resultant carbureted water gas being fixed as it flows up through the superheater 12'. The set of Figure 2 it will be noted differs from Figure 1 in that it does not involve a stack leading from the superheater. It has a stack valve 47 positioned on the top of the superheater.

The cycle of steps carried out in the set of Figure 2 is preferably the same as that hereinabove described in connection with the operation of the set of Figure 1; it will be understood, however, that the direction of flow through the superheater and carburetor during each step is the opposite of that involved in the set of Figure 1. Thus during the blast blast gases flow down through the carburetor and up through the superheater. During the reverse run steam flows down through the superheater up through the carburetor, oil being added to the steam when it is desired to reform, and the steam passing up through the fuel bed, the gas thus produced removing volatiles from the green coal zone of the fuel bed, the resulting fuel gas passing through pipe 18 to wash-box 22. Upon completion of this reverse run steam is passed through the ports 34 down through the fuel bed, the resultant water gas flowing through passageway 44 to the carburetor where it is carbureted by oil introduced through spray 46, the carbureted water gas passing from the base of the carburetor up through the superheater and then flowing through three way valve 19 into the wash-box 22.

Figure 6:
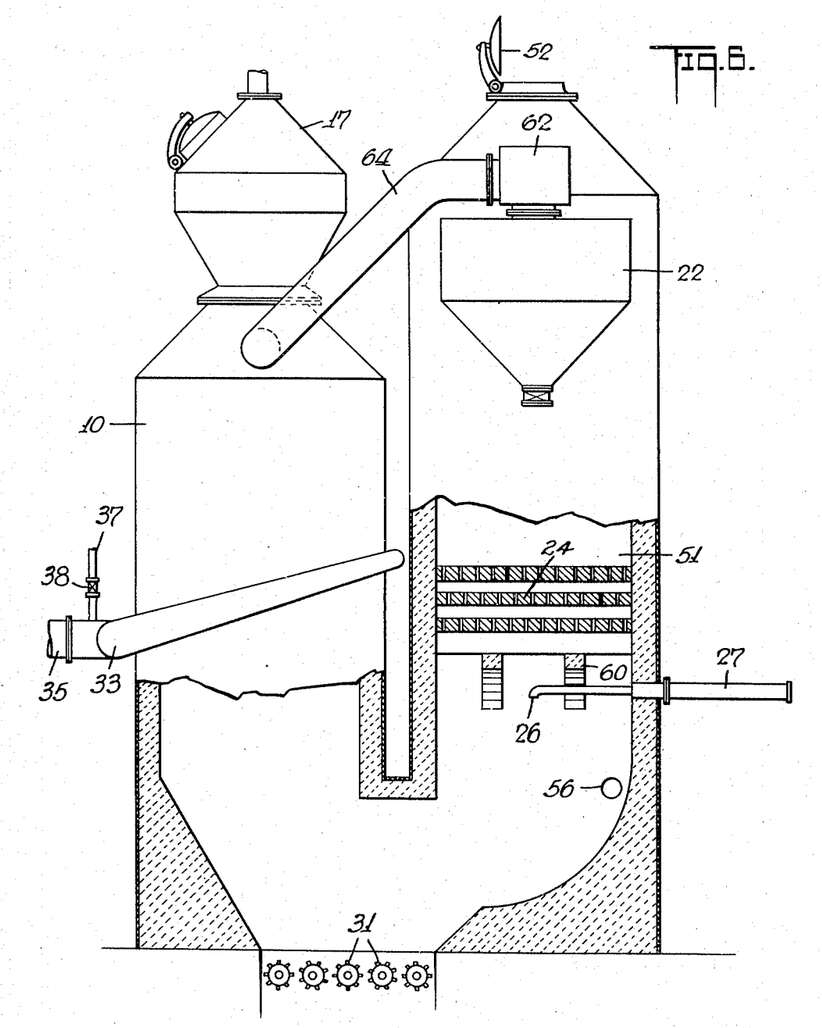
Figure 6 is a vertical section partly in elevation of a modified form of a two shell carbureted water gas set embodying this invention.

In the interests of clarity the conveyor for continuously removing ash and the associated ash pit and liquid seal have not been shown in Figures 2 and 6. The construction of these parts is the same as those hereinabove described in connection with the showing thereof in Figure 1.

Figure 4:
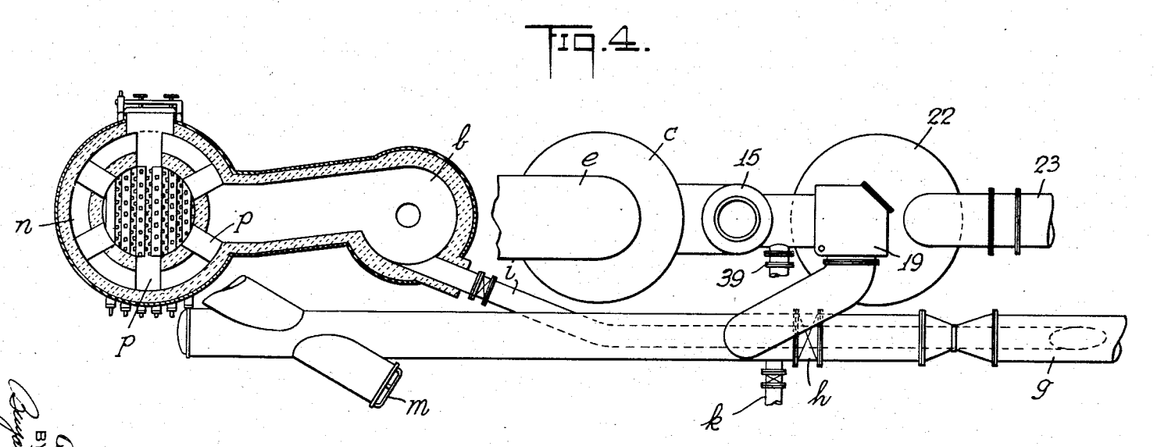
Figure 4 is a plan view partly in section of the set of Figure 3.

The modification of Figures 3 and 4 involves a generator of standard height, i. e., substantially the same as that of the carburetor and substantially less than that of the superheater. These two figures illustrate an embodiment of my invention in a reverse flow water gas set, which embodiment can readily be incorporated in existing reverse flow water gas sets with minimum changes in such sets. Thus the chief changes required are to modify the connections between the generator and carburetor and the generator and wash-box so that the backrun line, instead of leading from the bottom of the generator as is the practice in existing sets, leads from the top of the generator to the three way valve communicating with the wash-box and a connection is provided between the bottom of the generator and the bottom of the carburetor.

In Figures 3 and 4 the generator, carburetor and superheater are identified by reference characters $a$, $b$ and $c$, respectively. The conduit $d$ connects the base of the generator with the base of the carburetor $b$, and conduit $e$ leads from the top of the carburetor into the top of the superheater. The parts of the set of Figures 3 and 4 which are the same as those of the set of Figure 1 have been given like reference characters and it is believed no useful purpose would be served by describing them further. Backrun line $f$ leads from the top of the generator to the three way valve 19.

An air line $g$ for supplying air for blasting the fuel bed communicates with the backrun line $f$, the flow of air through this line being controlled by a valve $h$. Line $g$ communicates with a line $i$ having a valve $j$ therein for supplying secondary air to the base of the carburetor. Steam may be supplied to the generator to flow downwardly therethrough through a pipe $k$ leading into the backrun line $f$. As customary the backrun line $f$ may be provided with a safety valve $m$.

The bottom of the generator is formed with an annular space $n$ with which communicates the connection $d$ between the generator and the carburetor. As shown in Figure 1 this annular space $n$ is built into the brick lining $o$ for the generator. If desired, however, this annular space may be formed on the exterior of the generator shell so that the interior of the generator is of uniform diameter throughout its height rather than having a portion of smaller diameter near its base and a larger diameter portion at its top, as shown in Figure 3. The base portion of the annular channel or space $n$ communicates through a series of ports $p$, six in the embodiment shown in Figures 3 and 4, with the portion of the fuel bed directly above the ash removing device 31.

With the construction shown, during the reverse run, steam flows through the connecting passageway $d$ of relatively large cross sectional area into the annular space $n$ which is of relatively large volumetric capacity thereby tending to reduce the velocity of steam flow and then flows through the series of ports $p$, the combined exit area of which is relatively large minimizing turbulent flow and resulting in relatively smooth flow of the steam up through the fuel bed with consequent improved reaction between the steam and the carbon content of the fuel to produce water gas.

The top of the generator is provided with a bustle pipe $q$ provided with a series of ports extending through the generator walls. The bustle pipe $q$ and ports $r$ in general corresponding to bustle pipe 33' and ports 34' in Figure 1, except that in the modification of Figure 3 the pipe and ports lie in a horizontal plane at right angles to the longitudinal axis of the generator.

The cycle of steps carried out in the set of Figures 3 and 4 is preferably the same as that hereinabove described in connection with the operation of the set of Figure 1. Thus during the blasting step, air is introduced into the top of the generator above the fuel bed, flows downwardly therethrough, the resultant blast gases flowing through the ports $p$ into the annular space $n$ through the connecting passageway $d$ into the base of the carburetor where they are mixed with secondary air introduced through pipe $i$, the blast gases burning as they flow up through the carburetor, down through the superheater and up through the stack 15. During the reverse run steam introduced through pipe 39 flows down through the stack, up through the superheater, down through the carburetor, through the passageway $d$, annular space $n$, ports $p$, into the base of the generator upwardly therethrough the resultant water gas flowing through the backrun pipe $f$ into the three way valve housing 19 and thence to the wash-box. Upon completion of this reverse run, steam is passed through pipe $k$ into the backrun pipe $f$, flows down through the fuel bed in the generator, tar, which may be water gas tar or coal tar, being simultaneously introduced through the ports $r$ forming large carbon masses along the side walls of the generator, and the resultant gas flowing through the ports $p$, annular space $n$, connecting passage $d$ up through the carburetor, where they may be carbureted with oil and the carbureted water gas fixed as it flows down through the superheater. The carbureted water gas flows through the stack 15 into the three way valve 19 and thence into the wash-box 22.

In the modification of Figure 5 a generator 48 of conventional height, i. e., approximately one-half the height of the generators of Figures 1 and 2 is employed. The base of this generator communicates through the large open passageway 49 with the base of the carburetor 50. A superheater 51 is superimposed on the carburetor 50 and this superheater is provided with a stack valve 52.

As in the modification of Figure 1 the generator and carburetor rest on a supporting foundation 53 having inwardly sloping walls 54, the base of which form a rectangular opening 55. Ash removing device 31 is positioned in this opening 55 out of the path of hot gases flowing from the generator to the carburetor.

At the base of carburetor 50 is positioned a secondary air inlet 56. An ignition dome of refractory material having a central opening is disposed just above the secondary air inlet for the purpose of insuring ignition of the mixture of air and blast gases as they flow up through the carburetor. In the modification shown in Figure 5, except for this ignition dome, the carburetor is devoid of checkerbrick. If desired, however, two or more layers of checkerbrick may be disposed above the ignition dome. An oil spray 58 which may be of a retractible type as described in connection with Figure 1 is disposed at the top of the carburetor unit 50.

The base of the superheater is in open communication with the top of the carburetor, both of these units being located in one and the same shell. Checkerbrick 59 fills the superheater, these checkers resting on supporting arches 60.

A line 61 leads from the top of the superheater to a three way valve housing 62. This line 61 is provided with a steam inlet 63 for supplying steam to the superheater for the reverse run. A line 64 leads from the top of the generator to the valve housing 62. This valve housing is connected with the wash-box 22 by a line 65.

An air line 66 having a valve 67 therein communicates with the top of the generator. Steam is supplied to the top of the generator through steam inlet 68.

Disposed near the top of the fuel bed in the generator 48 is a bustle pipe 69 which encircles the generator and is provided with a series of ports 70 extending through the generator wall. Bustle pipe 69 is provided with hydrocarbon material such as tar or heavy oil through valve controlled pipe 71. The tar or heavy oil introduced through the port 70 flows down along the sides of the generator forming masses of carbon contiguous to the side walls which being of greater density than the remainder of the fuel bed impede and prevent the flow of gas along the side walls and causing flow of gas during both the up and back runs through the fuel bed to take place chiefly away from the side walls through the active main portion of the fuel bed resulting in more efficient steam carbon reaction to produce water gas and prevent adhesion of ash to the brick lining of the generator and the fusion thereof to form clinker masses along the side walls of the fuel bed. The tar or other hydrocarbon material is introduced during the step involving the flow of steam down through the fuel bed.

In the operation of the set of Figure 5 the fuel bed is always blasted downwardly by the introduction of air through pipe 66, the resultant blast gases being burned as they flow up through the carburetor and superheater, the air necessary to support combustion being supplied through secondary air inlet 56 and ignition of the mixture being insured by the ignition dome 57. The blast gases leave the superheater through the stack valve 52. Thereafter this stack valve is closed, steam is admitted through steam inlet 63 flows down through the superheater and carburetor into and up through the fuel bed in the generator, the resultant gas being withdrawn through pipe 64 passing through three way valve housing 62 thence through the pipes 65 into the wash-box 22. Upon completion of this step the three way valve is moved to close the backrun line 64 and place line 61 in communication with the wash-box. Steam is then admitted through inlet 68 passed down through the fuel bed and tar or other hydrocarbon material is added to the fuel bed to form carbon masses along the side walls as hereinabove explained. The flow of steam through the central main active portion is insured by the formation of carbon masses along the side walls as hereinabove described. The resultant water gas flows up through the carburetor where it is carbureted by oil added through the line 58 and the carbureted water gas flowing up through the superheater into the three way valve housing 62 and thence into the wash-box 22.

The duration of the cycles and the amount of steam employed during the reverse run and the make run involving the flow of steam down through the fuel bed preferably is the same as in the cycle of steps hereinabove described in connection with the operation of the apparatus of Figure 1.

In the operation of the set of Figure 5 it will be noted the fuel bed is blasted always downwardly thereby resulting in the formation of a fuel bed having its maximum temperature at the top and its lowest temperatures at the bottom, the temperature of the base being below the point at which fusion of ash takes place. Moreover the ash content of the fuel bed increases from top to bottom of the fuel bed the ash being continuously removed as formed by the ash removing device 41 as described in connection with the operation of the apparatus of Figure 1.

The set of Figure 6 differs from that of Figure 5 chiefly in that a generator the same as that involved in the modification of Figures 1 and 2 is employed; otherwise the set of Figure 6 is substantially the same as that of Figure 5, i. e., it involves a superheater superimposed on the carburetor both units being located in one and the same shell the base of the carburetor communicating with the base of the generator. The parts of the apparatus of Figure 6 corresponding to those of Figure 1 have been given the same reference characters. It is believed the structure and operation of the set of Figure 6 will be evident to those skilled in the art from the above description of the sets of Figures 1 and 5 and the operation of these sets.

While the generators of Figures 3 and 5 have not been shown as equipped with a charging machine, it will be understood that such charging machine, if desired, may be used.

The above description has been confined largely to the production of carbureted water gas; it will be understood that by the elimination of oil introduction into the make gas, water or blue gas will be formed and this invention comprehends apparatus for producing such water gas as well as apparatus for producing carbureted water gas. Also in the description of the process only the main steps have been described, as conventional purge steam runs which may be of 5 seconds duration may be carried out when desired, say after the blast and before the make run to prevent formation of explosive gas mixtures within the set.

From the above description of my invention it will be noted that formation of large clinker masses does not take place in the fuel bed and ash and small clinker particles are removed continuously without interrupting the gas making operations; hence it is not necessary to shut down the set periodically for removing clinkers and cleaning and repairing the generator side walls, as is the case in carbureted water gas apparatus heretofore used. Accordingly my invention saves labor and generator lining maintenance cost.

The use of a reverse run involving the flow of a major portion of the steam through the fuel bed with a consequent increased recovery of heat saves fuel, and makes it possible to use a shorter blast run thereby increasing the capacity of the set to produce make gas. Furthermore less steam is required per thousand cubic feet of water gas produced since the major portion of the steam, preferably from 60% to 95% of the total make steam, passes up through the fuel bed in which the temperature gradually increases from bottom to top of the fuel bed resulting in a very efficient utilization of the steam in the water gas reaction.

Formation of excessive peak production of gas is avoided since in operating in accordance with my invention the blue gas or water gas is carbureted during the run following the reverse steam run at which point in the cycle, relatively low blue gas production takes place resulting in more uniform gas production throughout both the reverse run and the run in which steam passes down through the fuel bed. Furthermore due to the employment of the reverse run preceding the carbureting water gas run the superheater is cooled to bring its temperature to a point below that at the point where the oil is admitted to the carburetor, thus providing a proper heat gradient from a high at the point of oil admission to a low at the outlet from the superheater; this results in conservation of oil used for carbureting purposes.

Operating in accordance with my invention with a large body of green coal above the point of introduction of the oxygen containing gas in the blasting step results in substantially smokeless operation. In my apparatus it will be noted the air for blasting always flows downwardly through the fuel bed, and hence passes through a substantial depth of hot fuel resulting in combustion of any volatile material removed from the fresh fuel. Hence little or no volatiles are left in the blast gases discharged into the atmosphere through the stack with consequent elimination of smoke. The feature of always blasting the fuel bed downwardly has the further important advantage in that it eliminates certain difficulties encountered in existing water gas apparatus in which the fuel bed is blasted upwardly, namely, in existing water gas apparatus the blast air carries "fly" ash from the base portion of the fuel bed upwardly towards the hot coke; the ash impinging on the coke particles forms a glaze of non-combustible material which slows down the rate of combustion of the coke during the blast and the steam carbon reaction during the make. By always blasting the fuel bed downwardly any "fly" ash in the upper portion of the fuel bed is carried towards the base portion into a zone where, as above pointed out, the temperature is below that at which fusion of the ash takes place, i. e., at a point below that at which the ash tends to flux with the fuel. Accordingly the "fly" ash mixes with the ash and small clinker particles and is removed from the fuel bed by the ash removing device; leaving the carbon in the hot upper portion in a highly reactive condition.

My invention involving the use of a generator designed to accommodate a deep bed of fuel with the introduction of air and steam during the blast and make cycles, respectively, at an intermediate point between the top and bottom of the fuel bed has a further important advantage in that it results in the removal of volatiles when employing bituminous coal as the fuel, which volatiles are not over-cracked since they are withdrawn with the water gas directly from the generator and passed to the wash-box. Hence operating in this manner substantial saving in oil required for carbureting the water gas is effected. Even with coke as the fuel supplied to the generator there is materially heat recovery in that the backrun gas is cooled in its flow through the portion of the coke bed above the point of air and steam introduction, the heat thus imparted to the coke as the coke enters the portion of the fuel bed where the air and steam is introduced thereinto being beneficially used in carrying out the gas making reactions.

The employment of a deep bed of fuel has the further advantage that it prevents the formation of blow holes in the fuel bed. Such blow holes are usually caused by the soft coal arching across the generator. The heavy load of fresh fuel in the top portion of the generator, employed in practicing my invention, overcomes the tendency of soft coal to "arch over" or "hang up" in the fuel bed and thus prevents the formation of such blow holes.

By introducing water gas tar into the fuel bed as hereinabove described the tar produced in the process may be beneficially utilized to make gas and at the same time the fuel bed is conditioned so as to eliminate channelling of gas along the side walls with consequent more uniform flow of steam and air through the active portions of the fuel bed.

The feature of having the generator and carburetor rest on the same supporting foundation simplifies the construction of the set. In the design shown in the drawing it will be noted the passageway between the generator and carburetor is of relatively large cross sectional area, and one and the same ash removing device supports the fuel bed in the generator and the portion thereof extending within the carburetor, onto which portion settles carbonaceous deposits formed in the carburetor by the cracking of heavy oil therein. Thus in operation this ash removing device effects removal of ash from both the generator and carburetor, the combustible content of the carbonaceous deposits being consumed to support the gas making reactions.

Since changes may be made without departing from the scope of the invention, it is intended that the above description should be interpreted in an illustrative and not in a limiting sense.

What is claimed is:

1. A carbureted water gas set comprising in combination a generator, carburetor and superheater located in separate and detached shells and connected in series, the base of the generator communicating with the base of the carburetor through a permanently unobstructed passage devoid of valves and the top of the carburetor communicating with the top of the superheater through a permanently unobstructed passage devoid of valves for flow of water gas from the generator up through the carburetor and down through the superheater and flow of steam up through the superheater, down through the carburetor into the base of the generator and up through the fuel bed therein, means for introducing air into the upper portion of the fuel bed for blasting the fuel bed in a downward direction, a gas offtake leading from the superheater and a separate gas offtake leading from the top of the generator bypassing the carburetor and superheater.

2. A carbureted water gas set comprising, in combination, a generator, a carburetor and superheater located in separate and detached shells and connected in series, the base of the generator communicating with the base of the carburetor and the top of the carburetor communicating with the top of the superheater for flow of water gas from the generator up through the carburetor and down through the superheater and flow of steam up through the superheater down through the carburetor into the base of the generator and upwardly through the fuel bed therein, the passage between the base of the generator and carburetor being permanently unobstructed and free of valves, a gas offtake leading from the top of the generator by-passing the carburetor and superheater, a second gas offtake leading from the base of the superheater and a single valve for controlling flow through both of said offtakes.

3. A carbureted water gas set as defined in claim 2, having tuyeres for the introduction of air and steam into the fuel bed disposed intermediate the top and bottom of the fuel bed.

4. A water gas set as defined in claim 1, having tuyeres for the introduction of air and steam into a fuel bed in the generator, said tuyeres being disposed intermediate the top and bottom of the fuel bed.

5. In a carbureted water gas set, a generator chamber adapted to contain a bed of fuel, a separate carburetor chamber disposed adjacent the generator chamber with the base of the carburetor chamber disposed in open communication with the base of the generator chamber, and means positioned in the connection between the generator chamber and carburetor chamber for supporting the generator fuel bed so that the major portion of said fuel bed is disposed within the generator chamber and only a minor portion is disposed within the carburetor chamber.

6. A carbureted water gas set comprising a generator chamber and a separate carburetor chamber, a supporting foundation for said generator and carburetor chambers having the interior walls of said foundation sloping downwardly towards each other, the generator and carburetor chambers resting on said supporting foundation in open communication with each other, an ash removing device for supporting a bed of fuel disposed in the base of said supporting foundation, and an oil spray in the top portion of said carburetor, carbonaceous deposits formed upon decomposition of oil settling onto the portion of the fuel bed disposed within the base of the carburetor.

7. A carbureted water gas set comprising a generator, carburetor and superheater located in separate and detached shells and connected in series, the base of the generator communicating with the base of the carburetor and the top of the carburetor communicating with the top of the superheater, a supporting foundation for said generator and carburetor having the interior walls thereof sloping downwardly towards each other, the generator and carburetor resting on said supporting foundation in open communication with each other, an ash removing device disposed in the base of said supporting foundation for supporting a bed of fuel with the major portion thereof in the generator and a minor portion in the base of the carburetor, and a gas offtake leading from the top of the generator by-passing the carburetor and superheater.

8. A carbureted water gas set comprising a generator, carburetor and superheater located in separate and detached shells and connected in series, the base of the generator communicating with the base of the carburetor and the top of the carburetor communicating with the top of the superheater, a supporting foundation for said generator and carburetor having the interior walls thereof sloping downwardly towards each other, the generator and carburetor resting on the top portion of said supporting foundation in open communication with each other, an ash removing device disposed in the base of said supporting foundation for supporting a bed of fuel with the major portion thereof in the generator and a minor portion in the base of the carburetor, a gas offtake leading from the top of the generator by-passing the carburetor and superheater, a liquid seal for the base portion of the said foundation to prevent the ingress of air into the generator and carburetor, and means for removing ash discharged by said ash removing device through said liquid seal, said ash removing device being disposed out of the path of the gases flowing from the generator into the carburetor.

9. A carbureted water gas apparatus as defined in claim 8, in which a wash-box is communicably connected with the superheater and with the gas offtake leading from the top of the generator and a valve controls the flow through the connections from the superheater and generator to the wash-box.

10. A carbureted water gas set comprising, in combination, a generator, carburetor and superheater connected in series, the base of the generator communicating with the carburetor by a permanently open passage free of valves and the carburetor communicating with the superheater by a permanently open passage free of valves for flow of water gas from the generator through the carburetor and superheater and flow of steam through the superheater and carburetor into the base of the generator and up through the fuel bed therein, and a connection leading from the top of the generator by-passing the carburetor and superheater.

11. A carbureted water gas set as defined in claim 10, in which the generator is of substantially the same height as the superheater and has therein a deep bed of fuel and the generator is provided with means for introducing air and steam thereinto disposed at a level intermediate the top and bottom of the fuel bed in the generator.

12. A carbureted water gas set comprising a generator, a carburetor having its base communicably connected with the base of the generator, a superheater superimposed on the carburetor the base of the superheater communicating with the top of the carburetor, the carburetor and superheater being located in one and the same shell and the generator being located in a separate shell, a gas offtake leading from the top of the generator by-passing the carburetor and superheater, and a second gas offtake leading from the top of the superheater.

GEORGE R. STEERE.

REFERENCES CITED

The following references are of record in the file of this patent:

UNITED STATES PATENTS

| Number | Name | Date |
| --- | --- | --- |
| 389,105 | Rew | Sept. 4, 1888 |
| 1,683,155 | Botsford | Sept. 4, 1928 |
| 1,956,284 | Hall | Apr. 24, 1934 |
| 2,067,052 | Haug et al. | Jan. 5, 1937 |
| 2,183,845 | Osmer | Dec. 19, 1939 |